July 6, 1954  E. LAHAIE  2,682,791
GUIDE FOR FILING THE TEETH OF MECHANICAL CHAIN SAWS
Filed March 3, 1953
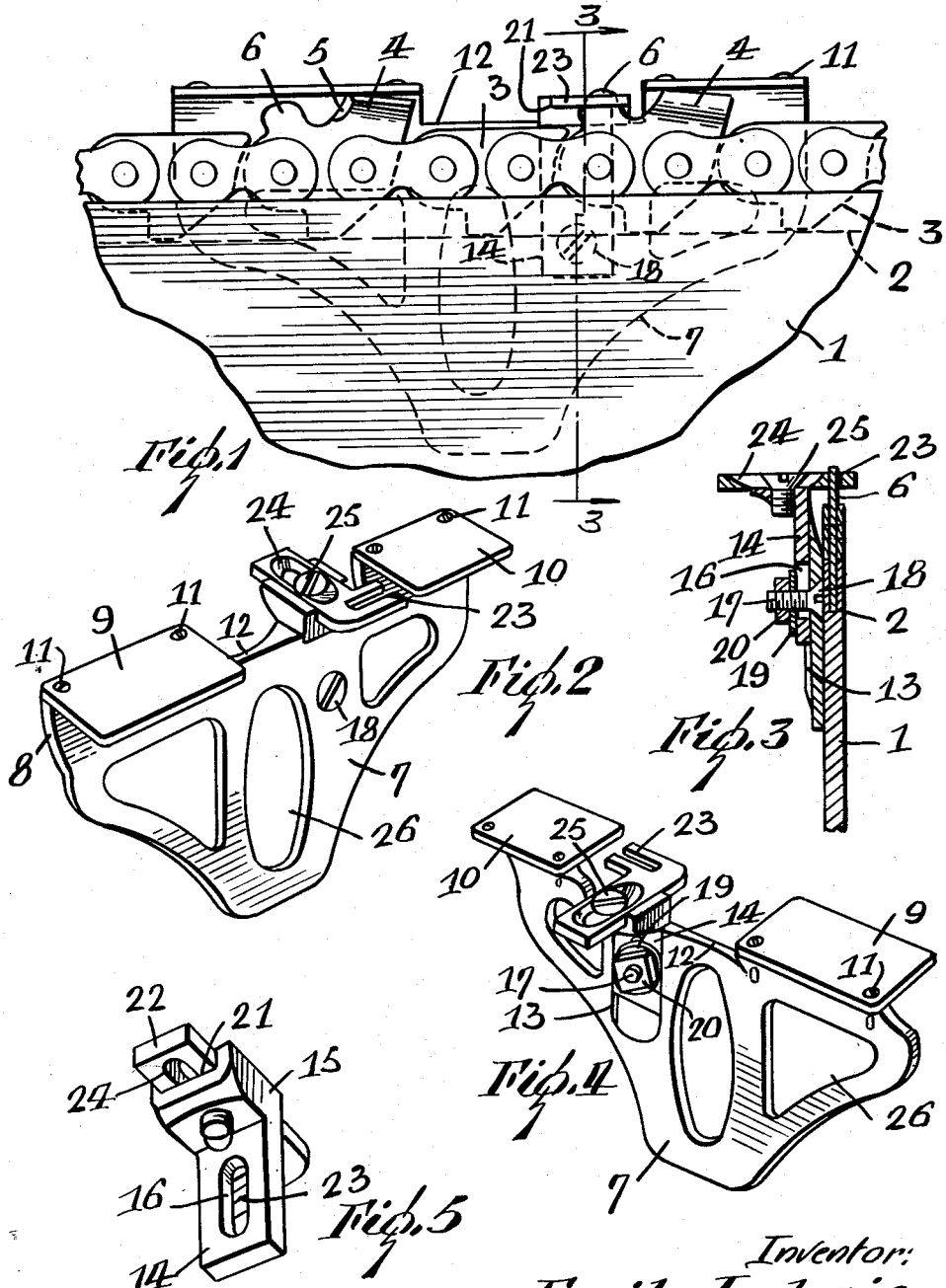
Inventor:
Emile Lahaie Patented July 6, 1954

2,682,791

UNITED STATES PATENT OFFICE 2,682,791

GUIDE FOR FILING THE TEETH OF MECHANICAL CHAIN SAWS

Emile Lahaie, St. Martyrs Canadiens, Quebec, Canada

Application March 3, 1953, Serial No. 340,085

4 Claims. (Cl. 76—46)

The present invention pertains to a guide for a file employed to shorten the scraping teeth of mechanical chain saws.

It is well known that the chain of a chain saw consists of links, some of which form the cutting teeth alternating with the shorter teeth that serve only to scrape the saw cut. These scraping teeth are shorter than the cutting teeth and should be shortened in a corresponding dimension.

The principal object of the invention is to obtain a guide of this kind which is easy to use and adjust.

Another object of the invention is to provide such a guide that can adjust itself to different levels as well as laterally.

Finally, a further object of the invention is to provide a guide that is inexpensive, of rugged construction and simple in design.

In the accomplishment of these objects, the device includes a frame formed of a thin vertical piece wider at the top than at the bottom. The upper part of the frame is bent to one side to receive on the surface, at the ends, two horizontal plates fixed by means of screws. Between the plates, the frame comprises a vertical slide in which is placed a piece bent at the top to form a horizontal portion. As the surface of the latter piece if formed, a transverse slide in which is adjusted a guide having a forked end surrounding the scraping tooth to be shortened.

The invention is fully disclosed by way of example in the following description and in the accompanying drawings in which:

Figure 1 is an elevation showing the device mounted on a chain saw;

Figure 2 is a perspective view of the device;

Figure 3 is a section on the line 3—3 of Figure 1;

Figure 4 is another perspective view at the side opposite that shown in Figure 2; and Figure 5 is a perspective view of the guide.

Reference to these views will now be made by use of like charatcers which are employed to designate corresponding parts throughout.

In Figure 1 is shown a portion of a guiding bar 1 of the known type secured to an ordinary mechanical saw. The bar is formed with a straight way or slideway 2 in which are placed the ends 3 of certain links of a chain having other links formed with teeth 4 bent alternately to one side and the other and formed each with a forward cutting edge 5. For properly sawing the wood, these teeth are inclined according to the filing angle, and the length of the teeth is thus reduced. The same link that carries a tooth 4 is also formed in front of such tooth with another tooth 6 which is rounded and vertical. The teeth 6, for scraping are shorter than the cutting teeth 4 since they only clear the groove formed by the teeth 4. This difference in length should remain, and this is a feature of the invention.

The invention therefore includes a frame 7 formed of a thin vertical piece of metal. This piece is wider at the top and curved at 8 at the top in order not aline with the surface that is to be applied against the vertical guide bar 1. The top of the piece 7 receives at each end a horizontal plate 9 or 10 fixed by screws 11. Between the plates 9 and 10 the top of the member 7 is notched at 12. In this notch, at the side of the bend 8, the member 7 is formed with a vertical groove 13 in which is slidably mounted another piece 14 bent at a right angle at 15, at its upper end in order to form a transverse horizontal surface. The vertical part of the member 14 is formed with a slot 16 to receive a screw 17 with a countersink head 18 which seats in a hole formed in the member 7. The other end of the screw 17 receives a washer 19 and a nut 20.

On the horizontal surface of the portion 15 is formed a transverse way 21 in which is slidably mounted a small strip 22 having one end bent horizontally and laterally and forked at 23 to constitute the guide which is the object of the invention. The member 22 has a chamfered slot 24 to receive a set screw 25 for securing the adjusted position of the member.

In the use of the device, the frame 7 is applied to the guiding bar 1 while the horizontal plates 9 and 10 rest upon two different teeth 4. The forked end 23 has been displaced laterally to surround a tooth 6 to be filed as in Figure 3. When properly positioned the fork is secured by the set screw 25. Next, the height of the fork is adjusted by vertically sliding the member 14 in the slot 13 to the height corresponding to the filing limit for the tooth 6. This position is secured by the screw 20.

The portion of the tooth 6 above the fork 23, shown in Figures 1 and 3, can easily be taken down with a proper file which will be guided on the fork and also limited thereby. To lighten the member 7, several openings 26 are formed therethrough at the center and ends. The bend 8 in the frame 7 serves to guide the chain saw sliding on the bar 1.

Although a specific embodiment of the invention has been illustrated and described, it will be understood that various alterations in the details of construction may be made without departing

What I claim is:

1. A guide for chain saws comprising a vertical frame member, a pair of spaced horizontal plates on the upper edge thereof, a member mounted for vertical sliding on said frame member between said plates, a guide member mounted for horizontal and rectilinear sliding movement upon said slidable member, and transversely of said frame member, an end of said guide member being forked and having tines in one horizontal plane and extending lengthwise of said frame member.

2. A guide for chain saws comprising a vertical frame member, a pair of spaced horizontal plates on the upper edge thereof, a member mounted for vertical sliding on said frame member between said plates, a guide member mounted for horizontal and rectilinear sliding movement upon said slidable member and transversely of said frame member, an end of said guide member being forked and having tines in one horizontal plane and extending lengthwise of said frame member, and set screws for securing the positions of said slidable members.

3. A guide as set forth in claim 1, wherein the upper portion of said frame member is bent laterally adjacent to said plates.

4. A guide as set forth in claim 2, wherein the upper portion of said frame member is bent laterally adjacent to said plates.

References Cited in the file of this patent

UNITED STATES PATENTS

| Number | Name | Date |
|---|---|---|
| 569,993 | Bennett | Oct. 27, 1896 |
| 941,981 | Du Bose | Nov. 30, 1909 |
| 1,192,285 | Dowling | July 25, 1916 |
| 1,192,925 | Mohney | Aug. 1, 1916 |
| 2,407,736 | Deurmyer et al. | Sept. 17, 1946 |